United States Patent [19]

Mabe

[11] Patent Number: 5,249,869
[45] Date of Patent: Oct. 5, 1993

[54] PRELOADED ASSEMBLY WITH THERMAL COMPENSATION

[75] Inventor: William J. Mabe, Thornton, Colo.

[73] Assignee: Sundstrand Corporation, Rockford, Ill.

[21] Appl. No.: 703,760

[22] Filed: May 21, 1991

[51] Int. Cl.⁵ ............................................. F16C 17/22
[52] U.S. Cl. ................................................ 384/278
[58] Field of Search ............... 384/278, 905, 493, 557, 384/605

[56] References Cited

U.S. PATENT DOCUMENTS

| | | |
|---|---|---|
| 3,359,047 | 5/1965 | Andersen. |
| 4,410,285 | 10/1983 | Strasser et al. ............ 384/278 |
| 4,623,810 | 11/1986 | Smith .......................... 384/278 |
| 4,848,935 | 7/1989 | Seibig et al. ................ 384/276 |
| 4,869,603 | 9/1989 | Melzer et al. .............. 384/278 |
| 4,952,078 | 8/1990 | Ankenbauer et al. ........ 384/905 |
| 5,073,039 | 12/1991 | Shervington ............... 384/278 |

*Primary Examiner*—Lenard A. Footland
*Attorney, Agent, or Firm*—Antonelli, Terry, Stout & Kraus

[57] ABSTRACT

A preloaded assembly (100) in accordance with the invention includes a stationary bushing (14) having an annulus (18); a shaft (12) having a first thermal coefficient of expansion with the shaft being mounted for rotation in the annulus of the stationary bushing; a first sleeve (102) which contacts the first shaft along a first portion (106) of an outside surface (104) of the shaft with the first sleeve having a second thermal coefficient of expansion; a second sleeve (108) having a third thermal coefficient of expansion, an outer surface (22) facing the annulus of the stationary bushing and an annulus with a first axial section (114) of the annulus of the second sleeve contacting a second portion (112) of the outside surface of the shaft adjacent the first portion and a second axial section (116) of the annulus of the second sleeve contacting an outside surface (118) of the first sleeve; and wherein the second coefficient of thermal expansion is greater than the third thermal coefficient of expansion and the shaft and sleeves rotate without slippage in unison in response to torque when an axial preload is applied to the shaft and sleeves within a predetermined range.

13 Claims, 2 Drawing Sheets

PRELOADED ASSEMBLY WITH THERMAL COMPENSATION

TECHNICAL FIELD

The present invention relates to preloaded assemblies with thermal compensation to maintain preload within predetermined limits during thermal cycling. More particularly, the present invention relates to preloaded assemblies of the foregoing type for use in static and in dynamic applications.

BACKGROUND ART

FIG. 1 illustrates a prior art sealess pump having process lubricated journal bearing made from ceramic materials, such as, silicon carbide. The pump has an impeller (not illustrated) which is located to the right of drive shaft 12. To the left of drive shaft 12 is located a motor drive (not illustrated). A stationary ceramic bushing 14 is mounted within the housing 16 of the pump. An inner bore 18 of the stationary ceramic bushing 14 forms a rotational support for a assembly 20 which is fixed to shaft 12 by a preload force F which is applied by a bolt assembly (not illustrated). The inner surface 18 of the stationary bushing 14 and the outside surface 22 of the assembly 20 form the rotatable support for the shaft 12 of the pump which is lubricated by fluid during operation.

The assembly 20 is comprised of a cylindrical ceramic sleeve 24 which is held against rotation with respect to the shaft 12 by a resilient gasket or wave spring 26 located outboard of axial ends of the cylindrical sleeve 24. Steel end caps 28 transfer the preload force F to the ceramic sleeve 24. The residual compression provided by the preload force F provides the necessary axial tightness in the assembly to prevent rotation of sleeve 24 relative to the shaft 12. Preload F at assembly must be kept within a narrow range to insure proper tightness at maximum operating temperatures to prevent rotation. With a pump or other rotary apparatus which is subject to thermal cycling, incorrect preloading of the assembly can result in catastrophic failure of the outer surface of the shaft 12 that faces the inner surface of the ceramic sleeve 24 as well as the inner surface 18 of the stationary bushing 14 and the outer surface 22 of the cylindrical sleeve 24.

While the prior art of FIG. 1 has been used successfully, it is a complicated structure requiring careful assembly to maintain the preload F within the proper narrow range to avoid spinning of the assembly 20 with respect to the shaft 12 throughout a wide range of operational temperatures.

FIG. 2 illustrates a prior art static assembly for maintaining a preload on a first stationary element 30 and a thermal compensating sleeve 32. The preload is established by applying torque to a fastener 34 which is threaded into a bore 36 of a second stationary element 38. The second stationary element 38 may be a pressure vessel with a seal 40 being located between the first and second stationary elements for retaining a pressurized fluid. It should be understood that only a portion of the first and second stationary elements 30 and 38 have been illustrated for the purpose of explaining the prior art. The first stationary element 30 has a thermal coefficient of expansion less than the thermal coefficient of expansion of fastener 34. The thermal compensating sleeve 32 is manufactured from a material having a thermal expansion chosen to provide thermal compensation for a particular temperature range of operation. Thermal compensation provided by the thermal compensating sleeve 32 is based upon the elongation of the fastener 34. The extended length of the fastener 34 resultant from the thermal compensating sleeve 32, the thermal coefficients of expansion of the first stationary member 30, thermal compensation sleeve 32 and fastener 34 and the temperature range of operation determine the final preload characteristic throughout the temperature range of operation. However, the thickness of the first stationary member 30 located between a bottom surface 44 of the thermal compensating sleeve 32 and a top surface 46 of the second stationary element 38 is sufficiently great that substantial differential expansion occurs between the first stationary element 30 and the fastener 34. As a result, maintaining a specified preload during thermal cycling of the assembly of FIG. 2 may be difficult when the temperature range of the thermal cycling is great.

DISCLOSURE OF INVENTION

The present invention is an improved preloaded assembly having static and dynamic applications which prevents substantial relieving of preload caused by thermal cycling of the assembly. With the invention, a sleeve is added to the preloaded assembly which does not span the entire length of the preloaded assembly which has a thermal coefficient of expansion equal to or greater than another sleeve or stationary member of the assembly to which the preload is applied. The thermal coefficient of expansion of the another sleeve is preferably equal to or greater than a shaft or a fastener to which the assembly is connected. Preferably, the length of the added sleeve is greater than a length of the another sleeve or member which extends from one end of the assembly to the second sleeve. As a result, thermal expansion of the sleeve substantially matches that of the shaft or the fastener over a substantial portion of the length of the assembly between which the preload is applied to prevent substantial differential thermal expansion causing the preload to vary outside acceptable limits for operation of the assembly during thermal cycling.

A preloaded assembly in accordance with the invention includes a stationary bushing having an annulus; a shaft having a first thermal coefficient of expansion with the shaft being mounted for rotation in the annulus of the stationary bushing; a first sleeve which contacts the first shaft along a first portion of an outside surface of the shaft with the first sleeve having a second thermal coefficient of expansion; a second sleeve having a third thermal coefficient of expansion, an outside surface facing the annulus of the stationary bushing and an annulus with a first section of the annulus of the second sleeve contacting a second portion of the outside surface of the shaft adjacent the first portion and a second axial section of the annulus of the second sleeve contacting an outside surface of the first sleeve; and wherein the second coefficient of thermal expansion is greater than the third thermal coefficient of expansion and the shaft and sleeves rotate without slippage in unison in response to torque when an axial preload is applied to the shaft and sleeves within a predetermined range. The stationary bushing and second sleeve may be composite materials and the annulus of the stationary bushing and an outer surface of the second sleeve are contacted with fluid during unitary rotation of the shaft and sleeves. The composite materials may be ceramic materials. The first portion of the outside surface of the shaft is longer than the second portion of the outside surface of the shaft. The second coefficient of thermal expansion is not less than the first thermal coefficient of expansion and may be greater than the first thermal coefficient of expansion depending upon the length of the shaft. The preloaded assembly may be a pump.

A preloaded static assembly in accordance with the invention includes a first stationary element having a first thermal coefficient of expansion with a first section having a first thickness and a second section having a reduced thickness less than the first thickness; a second stationary element spaced from the first stationary element by a distance greater than the reduced thickness with the elements being immovable with respect to each other; a spacer disposed between the second section and the second stationary element and having a second coefficient of thermal expansion; a fastener having a third coefficient of thermal expansion and applying the preload to the second section and the spacer; and wherein the second coefficient of thermal expansion is greater than the first coefficient of thermal expansion. The second coefficient of thermal expansion is not less than the third coefficient of thermal expansion. The length of the spacer between the second section and the second stationary element is greater than the reduced thickness.

In a preloaded assembly having a first member and a second member with the first member being disposed axially between first and second points and having a thermal coefficient of expansion greater than the second member, an improvement in accordance with the invention includes a third member which is disposed axially between the first point and a point of contact with the second member with the second member being disposed axially between an outer surface of the first member and an outer surface of the third member and the preload being applied to the first, second and third members; and wherein the third member has a thermal coefficient of expansion greater than the thermal coefficient of expansion of the second member. The thermal coefficient of expansion of the third member is not less than the thermal coefficient of expansion of the first member. The length of the third member disposed in the first direction between the first and second points is greater than the axial length of the second member disposed between the second point and an end of the third member.

BEST MODE FOR CARRYING OUT THE INVENTION

Figure 1:
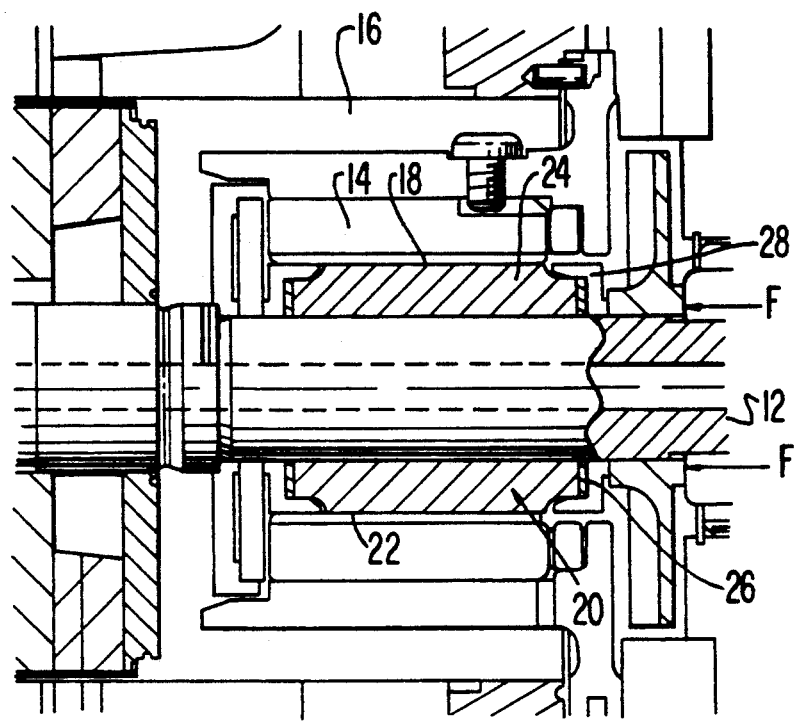
FIG. 1 illustrates a prior art pump with a preloaded bearing assembly with thermal compensation.
Figure 3:
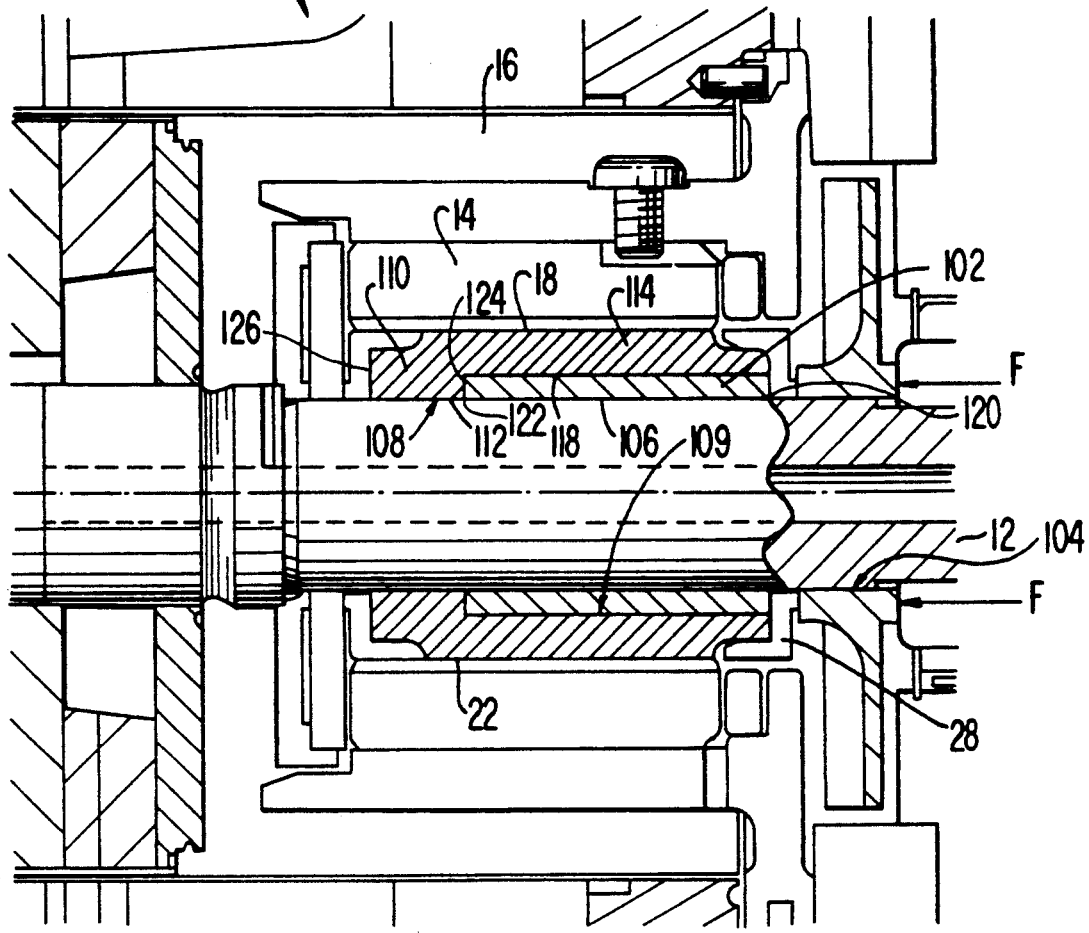
FIG. 3 illustrates a preloaded assembly in accordance with the invention for rotatably supporting a shaft with thermal compensation.

FIG. 3 illustrates a first embodiment 100 in accordance with the present invention. Like reference numerals identify like parts in FIGS. 1 and 3. The first embodiment 100 differs from the prior art of FIG. 1 in that a first sleeve 102 of third member contacts the first shaft along a first portion 106 of the outside surface 104 of the shaft 12. A second sleeve or second member 108 has an outside surface 22 facing the annulus 18 of the stationary bushing 14 and an annulus 109 facing the shaft or first member 12 and the first sleeve. The shaft or first member 12 is disposed in a first direction between a first point 120 and a second point 122. The first sleeve or third member 102 is disposed in the first direction between the first point 120 and a point of contact 124 with the second sleeve or second member 108. The second sleeve or second member 108 is disposed in a second direction between the outside surface 104 of the first sleeve or third member 102 and an outside surface 118 of the first sleeve or third member 102. A first axial section 110 of the annulus 109 contacts a second portion 112 of the outside surface 104 of the shaft or first member 12. The material from which the second sleeve or second member 108 is manufactured is preferably a composite and is preferably identical to the material from which the stationary bushing 14 is manufactured. Both the stationary bushing 14 and the second sleeve or second member 108 may be silicon carbide. A second axial section 114 of the annulus 109 contacts the outside surface 118 of the first sleeve or third member 102. The first sleeve or third member 102 is metallic and may be an alloy of steel. A coefficient of thermal expansion of a first sleeve or third member 102 is greater than the coefficient of thermal expansion of the second sleeve 108. Depending upon the temperature range of thermal cycling, the coefficient of thermal expansion of the first sleeve 102 is chosen to be not less than the coefficient of thermal expansion of the shaft or first member 12 and may be greater than the coefficient of thermal expansion of the shaft. The choice of the relative magnitude of the coefficients of thermal expansion of the first sleeve or third member 102 and the coefficient of thermal expansion of the shaft or first member 12 is determined by the relative length of the shaft or first member and sleeve or third member 102 and second sleeve or second member 108 and parts thereof and the thermal cycling of the particular application of the preloaded assembly 100 which may be utilized in a sealess pump of the type known in the prior art. A length of the first sleeve or third member 102 disposed int he first direction between the first and second points 120 and 122 is greater than a length in the first direction between the second point 122 and end 126 of the second sleeve or second member 108.

The application of the preload force F by a fastener (not illustrated) located to the right of the shaft or first member 12 applies the preload force to the assembly of the first sleeve or third member 102, second sleeve or second member 108 and end caps 28 which rotate in unison with the shaft. The amount of preload force F which is applied by the fastener at assembly is chosen such that at the highest operational temperature for which the assembly 100 is designed, each of the first sleeve or third member 102, second sleeve or second member 108 and end caps 28 rotate in unison without slippage. Slippage causes catastrophic failure of the shaft or first member 12 and/or stationary bushing 14 and the sleeve or third member 102 and the second sleeve or second member 108. During operation, fluid is located within the housing 16 to rotatably support the various moving surfaces and provide cooling. The end caps 28 are press fit on both axial ends of the second sleeve or second member 108 to pilot the unitary assembly on the shaft or first member 12. A radial clearance is provided between the second sleeve or second member and the shaft or first member 12.

Axial thermal growth is controlled by the first sleeve or third member 102 as a consequence of it being made from a material with an identical or greater thermal coefficient of expansion as the shaft 12.

An additional benefit of the assembly 100 is that unrestrained radial growth may occur without damage. Radial clearance is used between the inner surface of the second axial section 114 of the second sleeve or second member 108 and the outer surface 118 of the first sleeve or third member 102. Additionally, an axial clearance is provided between the second sleeve or second member 108 at an axial interface with the end caps 28. As a result, the second sleeve or second member 108 is free to grow axially and radially in response to thermal cycling without damage to the rotary assembly.

Figure 2:
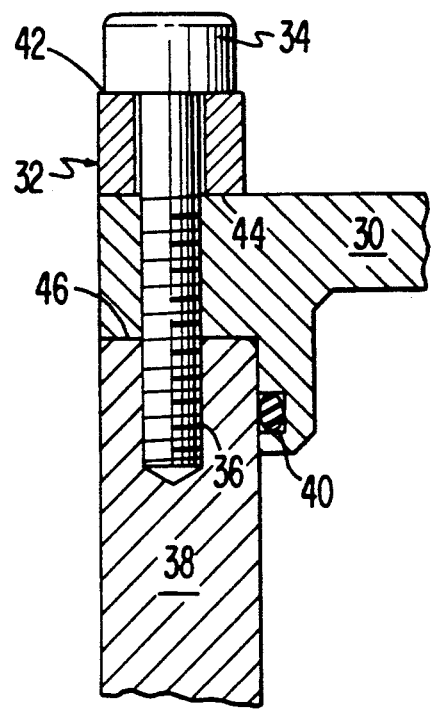
FIG. 2 illustrates a prior art static preloaded assembly with thermal compensation.
Figure 4:
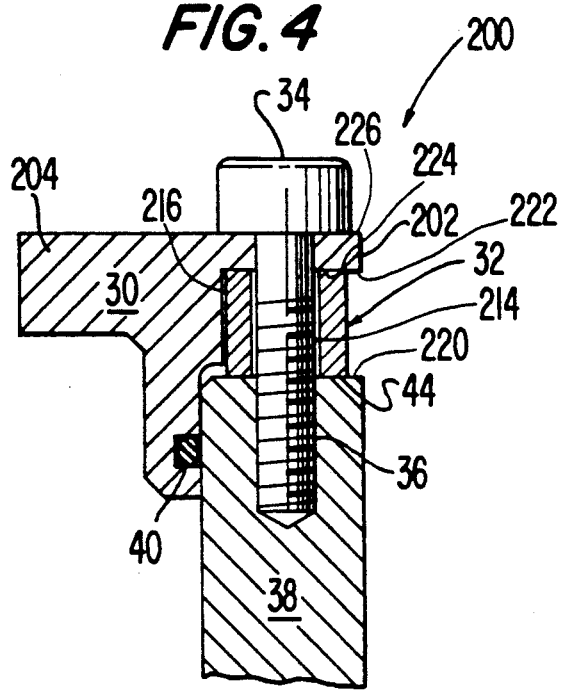
FIG. 4 illustrates a preloaded static assembly with thermal compensation in accordance with the present invention.

FIG. 4 illustrates a second embodiment 200 of the present invention which is utilized for static applications. Like reference numerals identify like parts in FIGS. 2 and 4. The second embodiment 200 differs from the prior art in that a thermal compensation sleeve or third member 32 is disposed between a first point 220 of the second stationary element 38 and a second point 222 of second section 202 of the first stationary element or second member 30. The thermal compensation sleeve or third member 32 may be metallic. The fastener 34 has an outer surface 214 and the compensation sleeve or third member 32 has an outer surface 216. The thickness measured with respect to the longitudinal axis of the fastener 34 of the second section 202 is less than the thickness measured with respect to the longitudinal axis of the fastener of the first section 204. The first stationary element or second member 30 and second stationary element 38 are fixed with respect to each other by the preload applied by the fastener or first member 34. The coefficient of thermal expansion of the thermal compensating sleeve 32 is greater than the coefficient of thermal expansion of the first stationary element or second member 30 and is preferably equal to or greater than the thermal coefficient of expansion of the fastener 34. The length of the thermal compensation sleeve or third member 32 disposed between reduced thickness section 202 of the first stationary element or second member 30 and the second stationary element 38 is greater than the thickness of the reduced thickness section. As a result of the coefficient of thermal expansion of the thermal compensation sleeve or third member 32 being greater than the coefficient of thermal expansion of the first stationary element or second member 30 and preferably equal to or greater than the coefficient of thermal expansion of the fastener 34, less differential expansion occurs during thermal cycling of the assembly 200 than in the prior art which lessens the likelihood that the preload applied to the first stationary element or second member 30 and the thermal compensation sleeve or third member 32 will move outside of the predetermined range which the assembly 200 is to maintain for fixing the first stationary member 30 with respect to the second stationary member 38 during thermal cycling. A length of the first sleeve or third member 32 disposed in the first direction between the first and second points 220 and 222 is greater than a length in the first direction between the second point 222 and end 226 of the first stationary element or second member.

While the invention has been described in terms of its preferred embodiments for dynamic and static applications, respectively in pumps and in a pressurized vessel, it should be understood that the applications of the present invention are not limited thereto. Furthermore, it should be understood that various substitutions of materials having the aforementioned thermal coefficients may be made without departing from the spirit and scope of the invention. It is intended that all such modifications fall within the scope of the appended claims.

I claim:

1. A preloaded assembly comprising:
   a stationary bushing having an interior surface forming an annulus;
   a shaft having a first thermal coefficient of expansion with the shaft being mounted for rotation within the annulus of the stationary bushing;
   a first sleeve which contacts the shaft along a first portion of an outside surface of the shaft with the first sleeve having a second thermal coefficient of expansion;
   a second sleeve having a third thermal coefficient of expansion, an outer surface engaging the annulus of the stationary bushing, a first axial section of the second sleeve contacting a second portion of the outside surface of the shaft adjacent the first portion, and a second axial section of the second sleeve contacting an outside surface of the first sleeve; and wherein:
   the second coefficient of thermal expansion is greater than the third thermal coefficient of expansion, and the shaft and sleeves rotate without slippage in unison in response to torque when an axial preload is applied to the shaft and the sleeves within a predetermined range.

2. A preloaded assembly in accordance with claim 1 wherein:
   the stationary bushing and second sleeve are composite materials and the annulus of the stationary bushing and an outer surface of the second sleeve are contacted with fluid during unitary rotation of the shaft and sleeves.

3. A preloaded assembly in accordance with claim 2 wherein:
   the composite materials are ceramic materials.

4. A preloaded assembly in accordance with claim 3 wherein:
   the first sleeve is longer than the first axial section of the second sleeve.

5. A preloaded assembly in accordance with claim 4 wherein:
   the second coefficient of thermal expansion is not less than the first thermal coefficient of expansion.

6. A preloaded assembly in accordance with claim 2 wherein:
   the first sleeve is longer than the first axial section of the second sleeve.

7. A preloaded assembly in accordance with claim 6 wherein:
   the second coefficient of thermal expansion is not less than the first thermal coefficient of expansion.

8. A preloaded assembly in accordance with claim 2 wherein:
   the second coefficient of thermal expansion is not less than the first thermal coefficient of expansion.

9. A preloaded assembly in accordance with claim 3 wherein:
   the second coefficient of thermal expansion is not less than the first thermal coefficient of expansion.

10. A preloaded assembly in accordance with claim 1 wherein:

the first sleeve is longer than the first axial section of the second sleeve.

11. A preloaded assembly in accordance with claim 10 wherein:
the second coefficient of thermal expansion is not less than the first thermal coefficient of expansion.

12. A preloaded assembly in accordance with claim 1 wherein:
the second coefficient of thermal expansion is not less than the first thermal coefficient of expansion.

13. A preloaded assembly in accordance with claim 1 wherein:
the assembly is disposed within a pump.

* * * * *